April 28, 1970 P. B. KUEHL 3,508,763
DIRIGIBLE WHEEL SUSPENSION WITH UNITARY LOWER CONTROL
ARMS AND TORSIONAL ROLL STABILIZER
Filed May 22, 1968 2 Sheets-Sheet 1

INVENTOR.
Paul B. Kuehl
BY
W. F. Wagner
ATTORNEY

INVENTOR.
Paul B. Kuehl
BY
W. F. Wagner
ATTORNEY

United States Patent Office
3,508,763
Patented Apr. 28, 1970

3,508,763
DIRIGIBLE WHEEL SUSPENSION WITH UNITARY LOWER CONTROL ARMS AND TORSIONAL ROLL STABILIZER
Paul B. Kuehl, Warren, Mich., assignor to General Motors Corporation, Detroit, Mich., a corporation of Delaware
Filed May 22, 1968, Ser. No. 731,194
Int. Cl. B60g *11/34*
U.S. Cl. 280—96.2       10 Claims

ABSTRACT OF THE DISCLOSURE

A suspension construction for vehicles in which each of a pair of wheels are rotatably and dirigibly mounted on laterally opposite generally vertically extending telescoping struts pivotally connected at their upper ends to the vehicle and at their lower ends to the outer ends of a pair of transversely oppositely extending vertically swingable control arms, the control arms being formed as a part of a continuous one-piece bar of uniform cross section which includes a central transversely extending torsionally active roll stabilizer portion, and the arms including portions angularly disposed relative to the central portion so that the sprung portion of the vehicle is supported in parallel ride deflection by torsional elasticity of such angularly disposed portions.

---

This invention relates to suspension for the dirigible wheels of a vehicle and more particularly, although not exclusively, to improved and simplified control arm and roll stabilizer construction therefor.

An object of the present invention is to provide an improved independent wheel suspension.

Another object is to provide an independent wheel suspension incorporating a one-piece member which is symmetrically formed to define a torsional roll stabilizer and the lower control arm for each of a pair of vehicle wheels.

The foregoing and other objects, advantages and features of the invention will become more readily apparent as reference is had to the accompanying specification and drawings wherein.

Figure 1:
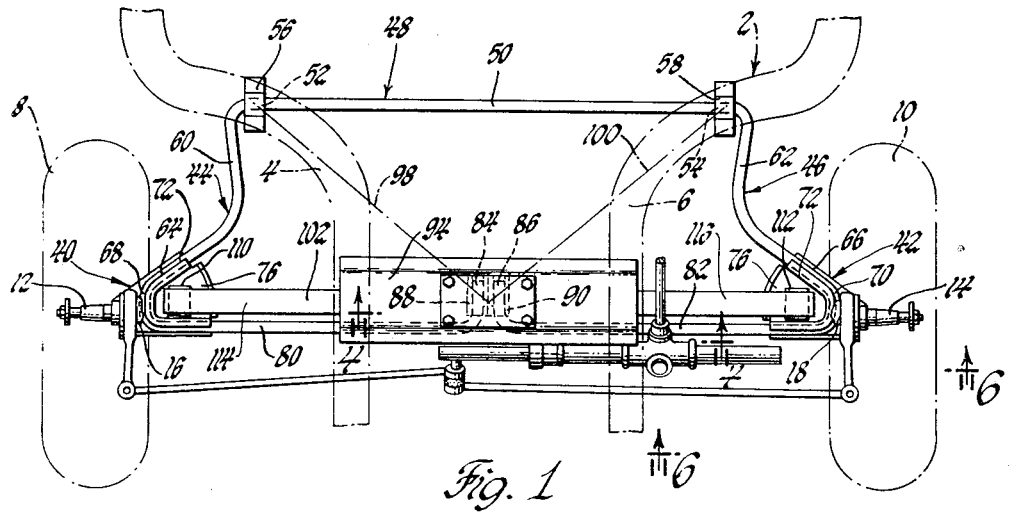
FIGURE 1 is a partial plan view of a vehicle incorporating a suspension and steering mechanism in accordance with the invention.
Figure 2:
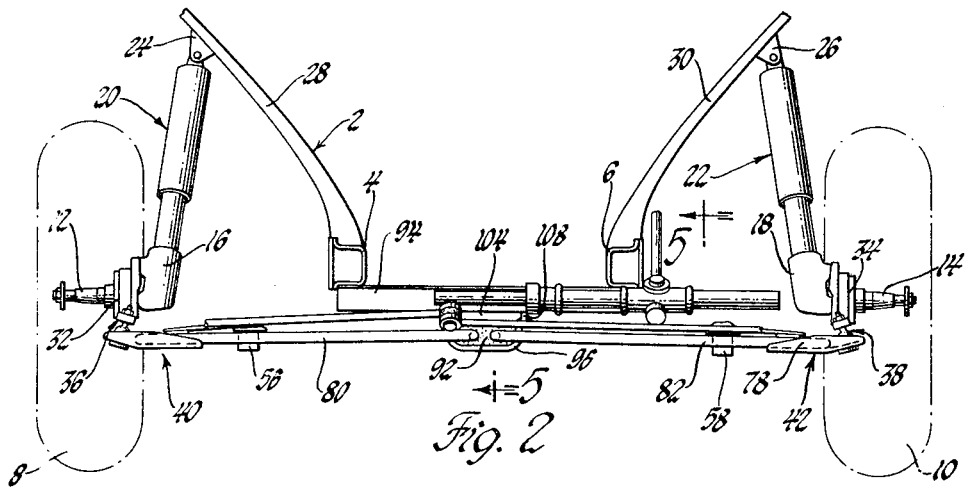
FIGURE 2 is a front elevational view of the construction shown in FIGURE 1.
Figure 3:
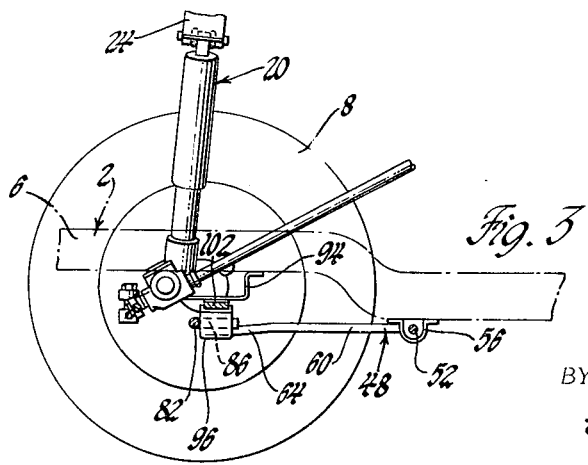
FIGURE 3 is a side elevational view of the construction shown in FIGURES 1 and 2.
Figure 4:
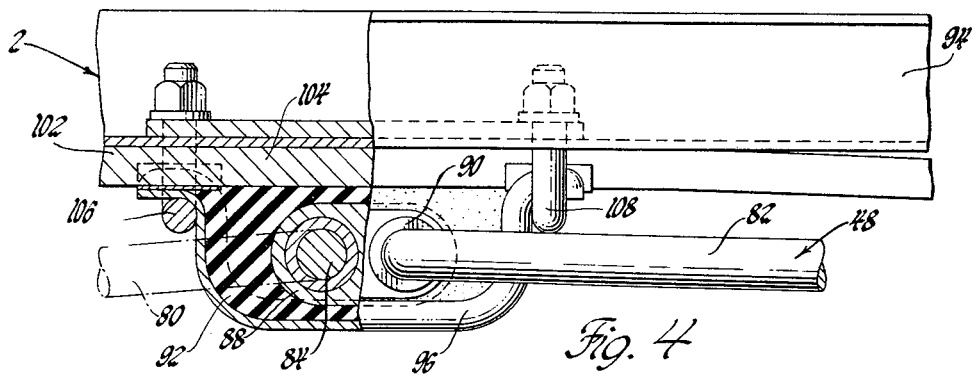
FIGURE 4 is a greatly enlarged sectional front elevational view looking in the direction of arrows 4—4 of FIGURE 1.
Figure 5:
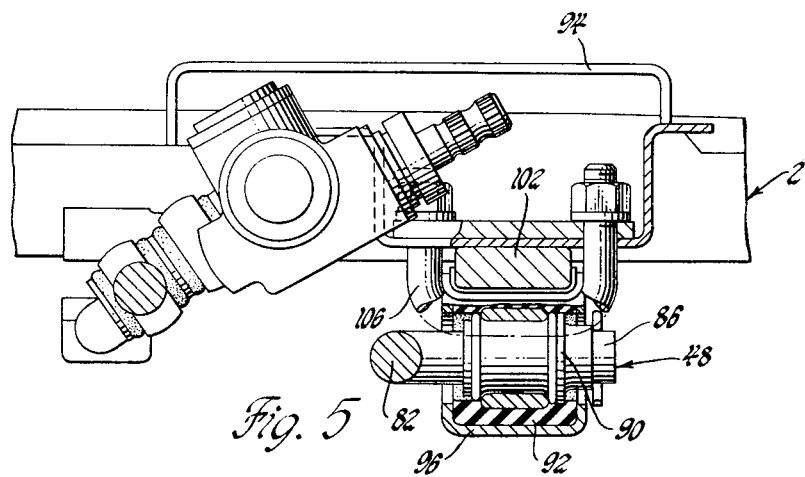
FIGURE 5 is a greatly enlarged side elevational view, partly in section, looking in the direction of arrows 5—5 of FIGURE 2.
Figure 6:
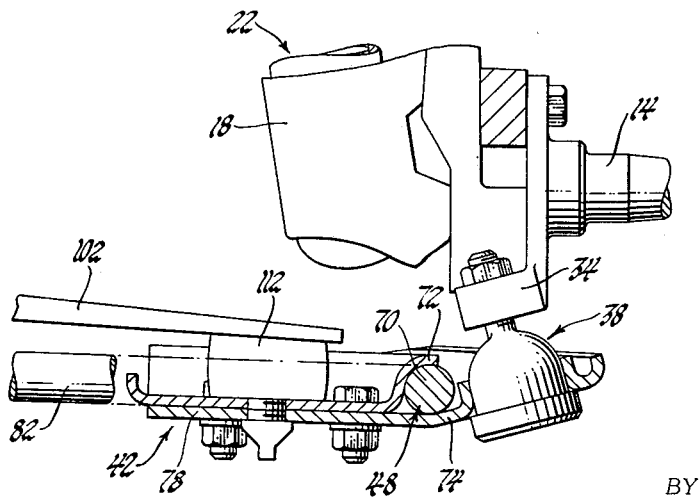
FIGURE 6 is a greatly enlarged front elevational view looking in the direction of arrows 6—6 of FIGURE 1.

Referring now to the drawings and particularly FIGURES 1 and 2, there is shown a portion of a vehicle in which the reference numeral 2 generally designates the sprung mass or superstructure which includes box section side rails 4 and 6. Disposed at opposite sides of the forwardly projecting portions of side rails 4 and 6 are a pair of road wheels 8 and 10 which are rotatably mounted on wheel spindles 12 and 14. Spindles 12 and 14 are formed integrally on steering knuckles 16 and 18 which in turn are connected to generally vertical extending shock absorbing telescoping strut assemblies 20 and 22. At their upper ends, struts 20 and 22 are pivotally connected to brackets 24 and 26 secured on overlying pillar portions 28 and 30 of the vehicle superstructure 2.

Laterally outwardly from the axes of struts 20 and 22, knuckles 16 and 18 are formed with bosses 32 and 34 to which are operatively connected ball joint assemblies 36 and 38. Assemblies 36 and 38 in turn are secured to sandwich type sheet metal bracket assemblies 40 and 42 which form the outer end of wheel control arm structures 44 and 46, shortly to be described.

According to the principal feature of the invention, the vehicle superstructure has mounted thereon rearwardly of wheels 8 and 10 a one-piece spring bar 48 which is bent into a symmetrical form defining both the wheel control arms 44 and 46, previously mentioned, and a roll stabilizer element 50 operative to resist body roll deflection. As seen best in FIGURE 1, spring bar 48 includes a transversely disposed central portion 50, the opposite extremities 52 and 54 of which are rotatably supported in strap-type rubber bushed brackets 56 and 58 mounted on side rails 4 and 6. Immediately outwardly of brackets 56 and 58, bar 48 is formed with laterally opposite forwardly extending portions 60 and 62 directed at substantially right angles to the axis of central portion 50. Forwardly of portions 60 and 62, the opposite ends of bar 48 sweep outwardly to define portions 64 and 66 extending in the direction of bracket assemblies 40 and 42. At their forward extremities, portions 64 and 66 are formed with acute angle bends 68 and 70 which conform with and are clamped in cooperating opposed channels 72 and 74 formed in the upper and lower plates 76 and 78 of brackets 40 and 42. Upon emerging from brackets 40 and 42, the opposite ends of bar 48 progress laterally oppositely inwardly to form straight transversely extending forward leg portions 80 and 82, the terminal extremities 84 and 86 of which are bent rearwardly in parallel relation and journalled in bearings 88 and 90 carried by an elastic element 92 which in turn is secured to a transverse vehicle frame member 94 by a saddle bracket 96.

When arranged in the manner described, the one-piece spring bar 48 operates in a manner providing geometric functions normally associated with the control arms, as well as affording a substantial proportion of the elastic medium utilized to support the sprung mass of the vehicle relative to the wheel. Additionally, in a manner shortly to be described, the spring bar 44 also functions to resist body roll deflection. In terms of geometric function, the control arms 44 and 46 for each wheel defined by the portions 60, 64 and 80 and 62, 66 and 82, respectively, swing about imaginary axes 98 and 100 which in turn respectively intersect the effective geometric centers of bracket 52 and bearing 88 and bracket 54 and bearing 90. The path of movement of arms 44 and 46 about their axes 98 and 100 in conjunction with the telescoping axis of displacement of struts 20 and 22 operate to control the deflection paths of wheels 8 and 10 as well as establishing and maintaining proper caster and camber angles. In terms of elastic function, because the portions 52 and 54 within brackets 56 and 58 extend along the axis of transverse portion 50 rather than axes 98 and 100, the deflection paths of the control arms seek to rotate the portions 52 and 54 in planes normal to the axes 98 and 100. However, because the portions 52 and 54 are integral with transverse portion 50, the portions 52 and 54 resist such rotation, with the result that deflection of the arms requires torsional deflection of the portions 60 and 62 which, depending on the cross sectional dimension of the bar, is utilized to provide all or part of the primary elastic medium supporting the vehicle sprung mass. In addition to anchoring function performed by the transverse portion 50, limited bending deflection thereof incident to vertical deflection of the control arms serves to augment the elastic support derived by torsional deflection of the portions 60 and 62.

In addition to the functions just described, the unitary spring bar provides a stabilizer function under conditions of vehicle body roll or under conditions of dissimilar direction of wheel deflection. Thus, for example, when the wheel 8 is elevated, swinging movement of the control arm 44 tends to rotate the adjacent portion of transverse bar 50 in one direction while opposite swinging movement of the control arm 46 causes the adjacent portion of transverse bar 50 to rotate in the opposite direction. The attendant torsional deflection of bar 50 reacts through the brackets 56 and 58 to resist vehicle body roll. It will thus be seen that the bar 50 functions transiently in three modes, i.e., under parallel ride conditions as a beam anchor, under roll deflection conditions as a torsion bar roll stabilizer, and under conditions of individual wheel deflection as a medium for equalizing load transversely of the vehicle.

While as stated previously the vehicle sprung mass may be elastically supported exclusively by torsional reaction of control arm portions 60 and 62, according to another feature of the illustrated embodiment of the invention, means are provided to augment the primary elastic medium effected thereby. To this end, as seen best in FIGURE 1, a single leaf spring 102 is disposed beneath the transverse frame member 94 with its central portion 104 rigidly secured thereto by U-bolt assemblies 106 and 108. At its lateral opposite ends, spring 102 engages bearing pads 110 and 112 mounted on the upper surface of brackets 40 and 42, respectively. Bending deflection imposed on the individual cantilever portions 114 and 116 of the spring during rising and falling movement of the control arms naturally augments the elastic support provided by torsional deflection of the portions 60 and 62 occurring during similar deflection.

While but one embodiment of the invention has been shown and described, it will be apparent that other changes and modifications may be made therein. It is, therefore, to be understood that it is not intended to limit the invention to the embodiment shown.

What is claimed is:

1. Independent suspension for a vehicle comprising a pair of wheels rotatably and dirigibly mounted on laterally opposite wheel knuckle assemblies, means mounting the upper ends of said assembly for movement through a predetermined vertical deflection path, transversely oppositely extending generally V-shaped control arms, means universally pivotally connecting the apices of said arms to said knuckle assemblies, means pivotally connecting one inner end of each arm to said vehicle adjacent the longitudinal centerline thereof, a transversely disposed member extending between and integral with the other inner end of each arm, said member being rotatably supported on said vehicle by a pair of laterally spaced apart bearings defining a common transverse axis, and a portion of each of said control arms adjacent said transverse member being disposed at an angle relative to said common axis whereby corresponding vertical deflection of said arms induces uniform rotation of said member and concurrent torsional deflection in said portions operative to elastically support the vehicle relative to the wheels while dissimilar vertical deflection of said arms induces concurrent torsional deflection in said portions and in said member.

2. The invention of claim 1 wherein said means pivotally connecting one inner end of each arm to said vehicle comprises bearing means defining parallel longitudinally extending axes.

3. The invention of claim 2 wherein said last mentioned bearing means are elastically supported on said vehicle.

4. The invention of claim 1 wherein said common transverse axis is spaced longitudinally rearwardly from the common axis of rotation of said wheels.

5. The invention of claim 4 wherein an imaginary axis intersecting one bearing defining the common transverse axis and the pivotal connection of the arm on the same side of the vehicle and an imaginary axis intersecting the other bearing defining the common transverse axis and the pivotal connection of the other arm are symmetrically forwardly convergent.

6. The invention of claim 5 wherein said means mounting the upper ends of each knuckle assembly comprises a pair of generally vertically extending telescoping struts pivotally mounted at their upper ends of said vehicle and rigidly connected at their lower ends to said knuckle assemblies.

7. The invention of claim 6 including a transverse single leaf spring secured centrally on said vehicle with its opposite ends overlying and abutting bearing pads formed near the apices of said control arms.

8. For use in a vehicle suspension, a unitary spring bar defining a pair of wheel control arms and a torsional roll stabilizer, said bar including a central straight portion adapted to be rotatably journalled in transversely spaced laterally aligned bearing means on the vehicle, a pair of symmetrically contoured portions formed at opposite extremities of said straight portion defining wheel deflection control arms projecting forwardly and outwardly from said straight portion, said symmetrically contoured portions including laterally inwardly directed straight portions having terminal extremities adapted to be journalled in transversely spaced apart longitudinally extending bearing means on said vehicle.

9. The invention of claim 8 wherein the cross sectional dimension of said spring bar is uniform from end to end.

10. The invention of claim 7 wherein said spring bar is circular in cross section.

References Cited

UNITED STATES PATENTS

| | | | |
|---|---|---|---|
| 2,290,923 | 7/1942 | Wahlbery | 280—96.2 |
| 2,624,592 | 1/1953 | MacPherson | 280—96.2 |
| 2,792,216 | 5/1957 | Janeway | 267—11 |
| 2,961,253 | 11/1960 | Allison | 280—96.2 |
| 3,149,855 | 9/1964 | Adloff et al. | 280—96.2 |

FOREIGN PATENTS

| | | |
|---|---|---|
| 538,215 | 7/1956 | Italy. |
| 659,387 | 10/1951 | Great Britain. |

KENNETH H. BETTS, Primary Examiner

U.S. Cl. X.R.

267—11, 22